US012603559B2

(12) United States Patent (10) Patent No.: US 12,603,559 B2

Fedida et al. (45) Date of Patent: Apr. 14, 2026

(54) VARIABLE CROSS-SECTION CONDUCTORS TO REDUCE ALTERNATING CURRENT LOSSES FOR AXIAL FLUX, RADIAL FLUX AND MOTORS WITH SKEW

(71) Applicant: GM Global Technology Operations LLC, Detroit, MI (US)

(72) Inventors: Vincent Fedida, Shanghai (CN); Alan G. Holmes, Clarkston, MI (US); Alexander Forsyth, Windsor (CA); Jian Yao, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 190 days.

(21) Appl. No.: 18/641,928

(22) Filed: Apr. 22, 2024

(65) Prior Publication Data

US 2025/0330075 A1 Oct. 23, 2025

(30) Foreign Application Priority Data

Apr. 17, 2024 (CN) .......................... 202410468172.5

(51) Int. Cl.
*H02K 21/24* (2006.01)
*H02K 1/16* (2006.01)
*H02K 3/28* (2006.01)

(52) U.S. Cl.
CPC ............... *H02K 21/24* (2013.01); *H02K 1/16* (2013.01); *H02K 3/28* (2013.01)

(58) Field of Classification Search
CPC ............. H02K 21/24; H02K 1/16; H02K 3/28
See application file for complete search history.

(56) References Cited

U.S. PATENT DOCUMENTS

| | | | |
|---|---|---|---|
| 7,557,486 B2 * | 7/2009 | Choi ...................... | H02K 1/148 |
| | | | 310/266 |
| 2010/0026221 A1 * | 2/2010 | Himmelmann ........ | F02M 37/08 |
| | | | 318/400.21 |
| 2016/0164358 A1 * | 6/2016 | Dehez ...................... | H02K 3/28 |
| | | | 310/208 |
| 2018/0034353 A1 * | 2/2018 | Gieras .................... | H02K 1/146 |

FOREIGN PATENT DOCUMENTS

DE           102022111250 A1      8/2023

* cited by examiner

*Primary Examiner* — Tulsidas C Patel
*Assistant Examiner* — Mohammed Ahmed Qureshi
(74) *Attorney, Agent, or Firm* — Vivacqua Crane, PLLC

(57) ABSTRACT

A vehicle electric motor system includes an electric motor having a rotor. Multiple windings are mounted on the rotors individually having a coiled conductor including multiple conductor elements. A width of successive ones of the conductor elements is varied. At least one of the multiple conductor elements includes a continuous tapering body on the axis and alternatively at least one of the multiple conductor elements includes a smallest cross-sectional area having a first thickness approximately at a midpoint of the at least one of the multiple conductor elements and opposed ends positioned oppositely about the smallest cross-sectional area individually having a conductor element second thickness greater than the first thickness.

20 Claims, 4 Drawing Sheets

ASYMMETRIC CROSS-SECTION
(GRADUAL 6<1,5<2,4<3)

ASYMMETRIC CROSS-SECTION
(INCREMENTAL 6<1)

VARIABLE CROSS-SECTION CONDUCTORS TO REDUCE ALTERNATING CURRENT LOSSES FOR AXIAL FLUX, RADIAL FLUX AND MOTORS WITH SKEW

INTRODUCTION

The present disclosure relates to electric motors and electrical conductors for electric motors.

For an axial flux motor (AFM) including electric motors used in vehicles, a copper conductor loss may be artificially split between a direct current (DC) portion linked to dimensions of the copper conductor and an alternating current (AC) portion due to the heterogeneity in a current density distribution. The AC portion is created by a time-variable magnetic field crossing the copper conductor and is produced by two sources. A first source defines a magnetic field produced by a skin effect of the conductor itself. A second source defines a magnetic field produced by other magnetic sources including proximity effects. In an electric motor these effects build up together and result in a strong variable magnetic field that crosses the motor conductors close to an airgap, which produces AC production losses.

Thus, while current systems and methods to reduce AC losses of electric motors achieve their intended purpose, there is a need for a new and improved system and method to reduce AC losses of electric motors.

SUMMARY

According to several aspects, a vehicle electric motor system, includes an electric motor having a rotor. Multiple windings mounted on the rotor individually have a coiled conductor including multiple conductor elements. A width of individual ones of the multiple conductor elements is varied.

In another aspect of the present disclosure, the electric motor defines an axial flux motor having a central positioned stator.

In another aspect of the present disclosure, the conductor elements include: a first conductor element having a first width; a second conductor element having a second width greater than the first width; a third conductor element having a third width greater than the second width; a fourth conductor element having a fourth width substantially equal to the third width; a fifth conductor element having a fifth width substantially equal to the second width; and a sixth conductor element having a sixth width substantially equal to the first width.

In another aspect of the present disclosure, the conductor elements include: a first conductor element having a first width; a second conductor element having a second width greater than the first width; a third conductor element having a third width substantially equal to the second width; a fourth conductor element having a fourth width substantially equal to the second width and the third width; a fifth conductor element having a fifth width substantially equal to the second width, the third width and the fourth width; and a sixth conductor element having a sixth width substantially equal to the first width.

In another aspect of the present disclosure, the rotor defines a first rotor having an axial skew and a second rotor having an axial skew, with the first rotor positioned proximate to a d-axis of the electric motor and the second rotor positioned proximate to a q-axis of the electric motor.

In another aspect of the present disclosure, the conductor elements include: a first conductor element having a first width; a second conductor element having a second width greater than the first width; a third conductor element having a third width substantially equal to the second width; a fourth conductor element having a fourth width substantially equal to the second width; a fifth conductor element having a fifth width substantially equal to the second width; and a sixth conductor element having a sixth width less than the first width.

In another aspect of the present disclosure, the multiple conductor elements include: a first conductor element having a first width; a second conductor element having a second width greater than the first width; a third conductor element having a third width greater than the second width; a fourth conductor element having a fourth width less than the third width and greater than the second width; a fifth conductor element having a fifth width less than the second width and greater than the first width; and a sixth conductor element having a sixth width less than the first width.

In another aspect of the present disclosure, the motor defines a radial flux motor having an axial rotor skew.

In another aspect of the present disclosure, the motor defines a radial flux motor and the rotor defines a double rotor.

In another aspect of the present disclosure, the motor defines a radial flux motor having a stator defining a double stator.

According to several aspects, a vehicle electric motor system includes an electric motor having: at least one rotor; and at least one stator. Multiple permanent magnets are positioned on the at least one stator. Multiple windings are mounted on the at least one rotor individually having a coiled conductor including multiple conductor elements, individual ones of the multiple conductor elements vary in width. The rotor includes an axial rotor skew.

In another aspect of the present disclosure, the motor defines a radial flux motor.

In another aspect of the present disclosure, the at least one rotor defines a first rotor and a second rotor; and wherein the at least one stator defines a first stator and a second stator.

In another aspect of the present disclosure, a first airgap is located between the first rotor and the first stator, and a second airgap is located between the second rotor and the second stator, the first airgap and the second airgap together defining a dual airgap.

In another aspect of the present disclosure, the at least one of the multiple conductor elements is positioned proximate to the first rotor and the second rotor and skews a load toward a d-axis of the radial flux motor has a cross-section change in an axial direction; and the at least one of the multiple conductor elements is shaped having a smaller cross-section compared to individual ones of the multiple conductor elements positioned proximate to a q-axis and skews the load toward the q-axis of the radial flux motor. The at least one of the multiple conductor elements includes: a smallest cross-sectional area having a first thickness approximately at a midpoint of the at least one of the multiple conductor elements; and opposed ends positioned oppositely about the smallest cross-sectional area individually having a conductor element second thickness greater than the first thickness.

In another aspect of the present disclosure, at least one of the multiple conductor elements positioned proximate to the first rotor and the second rotor and leaning toward a d-axis of the radial flux motor has a cross-section change on an axis of the electric motor. The at least one of the multiple conductor elements includes a continuous tapering body on the axis.

In another aspect of the present disclosure, the motor defines an axial flux motor having an axial rotor skew.

According to several aspects, a method for reducing alternating current losses of a vehicle electric motor, comprising: producing an electric motor including mounting multiple windings on a first stator and an opposed second stator together defining a double stator; positioning the first stator and the second stator between a first rotor and a second rotor defining a double rotor; locating a first airgap between the first rotor and the first stator, and a second airgap between the second rotor and the second stator, the first airgap and the second airgap together defining a dual airgap; positioning multiple permanent magnets on the first stator and the second stator; mounting multiple windings on the first rotor and the second rotor; constructing individual coiled conductors for individual ones of the multiple windings having multiple conductor elements; and varying a width of individual ones of the multiple conductor elements.

In another aspect of the present disclosure, the method further includes configuring the electric motor as an axial flux motor wherein the first rotor and the second rotor have an axial skew.

In another aspect of the present disclosure, the method further includes configuring the electric motor as a radial flux motor wherein the first rotor and the second rotor have an axial skew.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
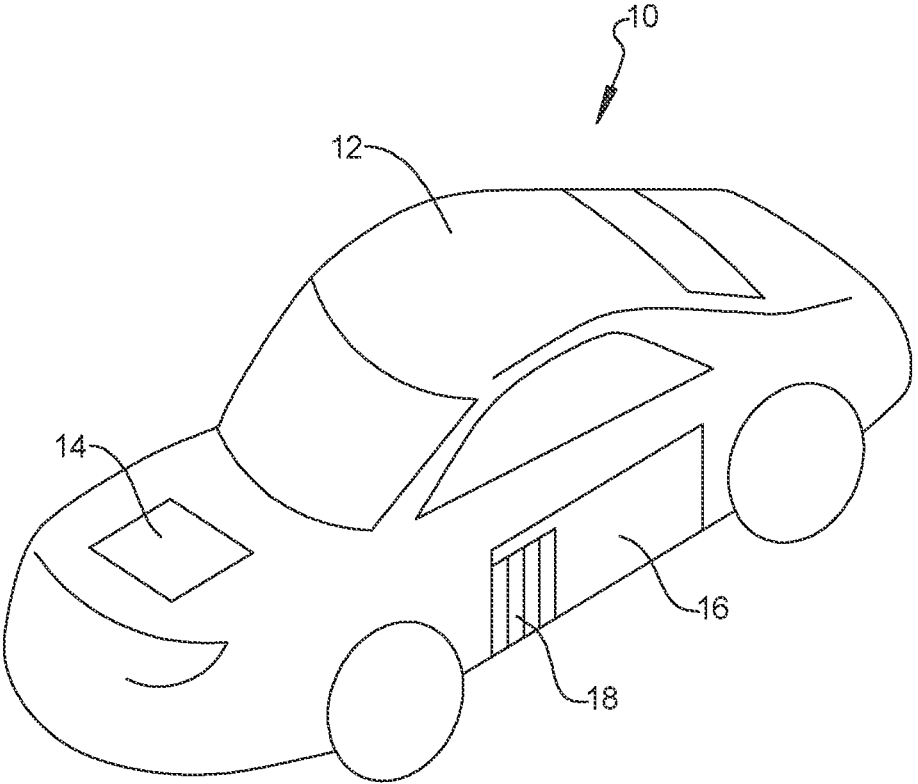
FIG. 1 is a left side perspective view of a vehicle having a vehicle electric motor system according to an exemplary aspect.

Referring to FIG. 1, a vehicle electric motor system 10 is provided for a vehicle 12 powered by at least one axial flux motor 14. The axial flux motor 14 receives electrical power from a battery pack 16 providing electrical power for propulsion and operation of multiple systems of the vehicle 12. The vehicle 12 may define a sedan, a sport utility vehicle, a van, a truck or an autonomous vehicle collectively defining a battery electric vehicle. The battery pack 16 may include multiple battery cells 18 individually generating electrical power. The vehicle 12 may also include an additional power source including a gasoline engine or a hydrogen fuel cell to provide a portion of a battery charging current or a portion of a propulsion force to aid the battery pack 16 in powering the vehicle 12. According to several aspects the battery cells 18 may include any configuration of battery cell geometry, including cylindrical cells and/or rectangular cells, with a cylindrical cell geometry shown only for illustration.

Referring to FIG. 2 and again to FIG. 1, according to several aspects, a portion of an axial flux motor 20 that may be substituted for the axial flux motor 14 provides multiple windings including for example a first winding 22, a second winding 24 and a third winding 26, wherein the windings individually include six winding turns. The windings are mounted on a central first stator 28 and an opposed central second stator 30 together defining a double stator which are positioned between a first rotor 32 and a second rotor 34 defining a double rotor. The first rotor 32 and the second rotor 34 have surface mounted permanent magnets and both coaxially rotate with respect to a longitudinal rotational axis 36. A first airgap 38 is located between the first rotor 32 and the first stator 28, and a second airgap 40 is located between the second rotor 34 and the second stator 30, the first airgap 38 and the second airgap 40 together defining a dual airgap. Using the dual airgap-in a disc-type motor is effective to eliminate undesirable axial force between a stator and a rotor, by which higher power density of the electric motor may be achieved.

Figure 2:
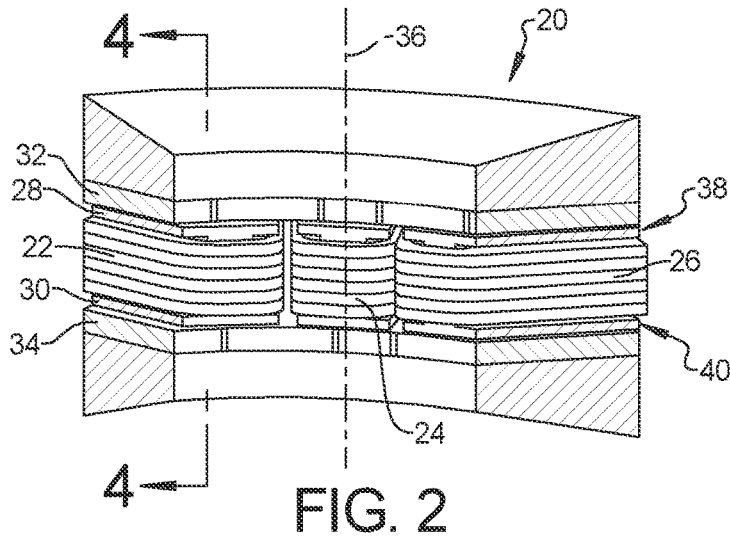
FIG. 2 is a cross-sectional side elevational view of an axial flux motor of the vehicle electric motor system of FIG. 1 having six turn windings.

Referring to FIG. 3 and again to FIG. 2, an axial flux motor 42 is modified from the axial flux motor 20 to include multiple layer strands 44 in individual ones of the six winding turns 46. The multiple layer strands 44 reduce alternating current (AC) loss of the multiple windings.

Figure 3:
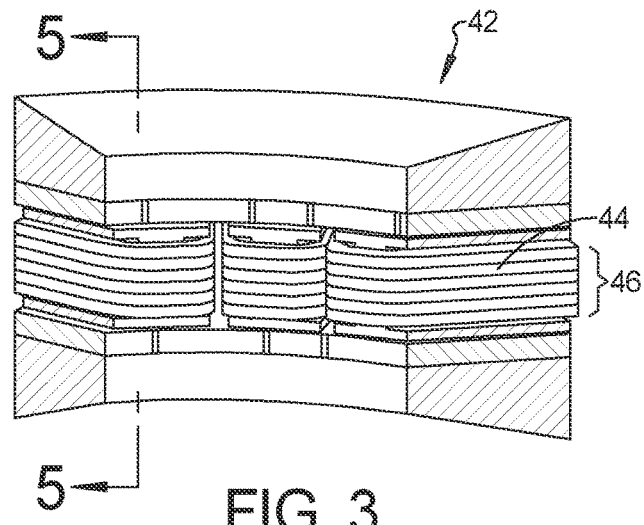
FIG. 3 is a cross-sectional side elevational view of an axial flux motor of the vehicle electric motor system of FIG. 1 having six turn stranded windings.

Referring to FIG. 4 and again to FIGS. 1 through 3, individual ones of the windings such as the first winding 22 shown may be provided having a coiled conductor including different widths or cross sections between different layers or sections of the conductors of the first winding 22. According to several aspects, the first winding 22 may include conductor elements which all have a common height but have cross-sections that vary, including widths which vary, such as a first conductor element 48 having a first or narrowest width of the first winding conductor and a second conductor element 50 proximate to the first conductor element 48 having a width greater than the cross section of the first conductor element 48. A third conductor element 52 positioned proximate the second conductor element 50 has a width greater than the width of the second conductor element 50 and substantially equal to a width of a fourth conductor element 54 positioned proximate to the third conductor element 52. A fifth conductor element 56 positioned proximate the fourth conductor element 54 has a width substantially equal to the width of the second conductor element 50, and a sixth conductor element 58 positioned proximate to the fifth conductor element 56 has a width substantially equal to the width of the first conductor element 48. Advantages provided by the first winding 22 include by positioning those conductor elements such as the first conductor element 48 and the sixth conductor element 58 having a least width of the conductor elements closest to the first airgap 38 and the second airgap 40 respectively, and positioning those conductor elements having the greatest width such as the third conductor element 52 and the fourth conductor element 54 closest to a center of the grouping of conductor elements, AC and direct current (DC) loss effects are balanced.

Figure 4:
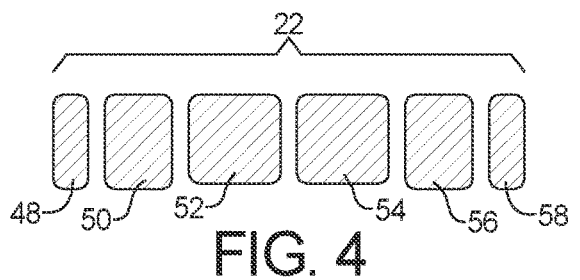
FIG. 4 is a cross-sectional front elevational view taken at section 4 of FIG. 3.

Referring to FIG. 5 and again to FIG. 4, a winding 60 is modified from the first winding 22 to provide conductor elements such as a first conductor element 62 and a sixth conductor element 72 commonly having a conductor element minimum width at opposed ends of the winding 60. A second conductor element 64, a third conductor element 66, a fourth conductor element 68 and a fifth conductor element 70 individually have an equal width to each other and greater than the width of the first conductor element 62 and the sixth conductor element 72. Similar to the first winding 22, by positioning those conductor elements such as the first conductor element 62 and the sixth conductor element 72 having a least width of the conductor elements closest to the first airgap 38 and the second airgap 40 respectively, and positioning those conductor elements having the greatest width such as the second conductor element 64, the third conductor element 66, the fourth conductor element 68 and the fifth conductor element 70 closest to a center of the grouping of conductor elements, AC and direct current (DC) loss effects are balanced.

Figure 5:
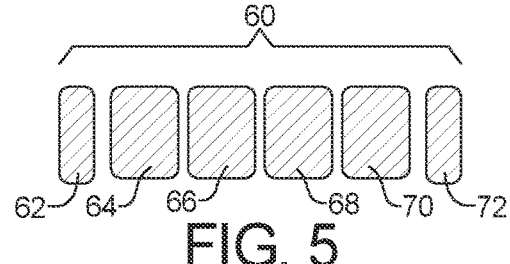
FIG. 5 is a cross-sectional front elevational view taken at section 5 of FIG. 2.

Referring to FIG. 6 and again to FIGS. 4 and 5, a winding 74 is modified from the first winding 22 and winding 60 to provide conductor elements having asymmetric widths or cross sections, together with conductor elements at opposed ends defining the smallest widths of all of the conductor elements. The conductor element asymmetric widths or cross sections are provided with winding skew such that with a motor load a portion of the load is shifted toward the motor d-axis and a portion is shifted toward the motor q-axis. According to several aspects, a sixth conductor element 86 has a width less than a width of a first conductor element 76. A fifth conductor element 84 has a width greater than the width of the first conductor element 76 but less than a width of a second conductor element 78. A fourth conductor element 82 has a width greater than the width of the second conductor element 78 and therefore greater than the width of the fifth conductor element 84, but less than a width of a third conductor element 80 which has a greatest width of the six conductor elements of the winding 74. The airgap, AC and DC loss effects advantages of the first winding 22 described above in reference to FIG. 4 are similarly provided by the winding 74.

Figure 6:
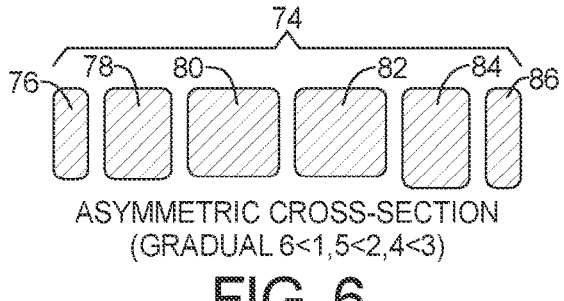
FIG. 6 is a cross-sectional side elevational view of an axial flux motor modified from FIG. 4 having six turn windings with gradual asymmetric cross-sections.
Figure 7:
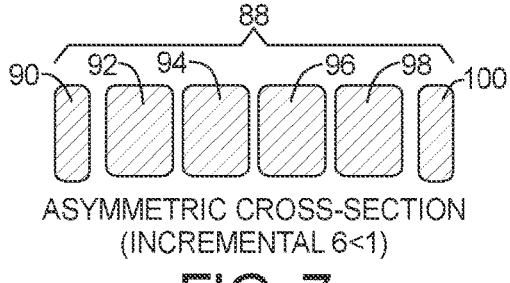
FIG. 7 is cross-sectional side elevational view of an axial flux motor modified from FIG. 4 having six turn windings with incremental asymmetric cross-sections.

Referring to FIG. 7 and again to FIGS. 4 through 6, a winding 88 is modified from the first winding 22, winding 60 and winding 74 to provide conductor elements having asymmetric widths or cross sections, together with conductor elements at opposed ends defining the smallest widths of all of the conductor elements. As noted above with respect to FIG. 6, the conductor element asymmetric widths or cross sections are provided with winding skew such that with a motor load a portion of the load is shifted toward the motor d-axis and a portion is shifted toward the motor q-axis. According to several aspects, a sixth conductor element 100 has a width less than a width of a first conductor element 90. A second conductor element 92, a third conductor element 94, a fourth conductor element 96 and a fifth conductor element 98 individually have equal widths to each other and greater than the width of the first conductor element 90 and the sixth conductor element 100. The airgap, AC and DC loss effects advantages of the first winding 22 described above in reference to FIG. 4 are similarly provided by the winding 88.

Referring to FIG. 8 and again to FIGS. 1 through 7, an interior permanent magnet radial flux motor 102 includes skew to maintain AC effects along an axial length of the radial flux motor 102. A first rotor 104 is axially skewed to a similar degree with respect to a second rotor 106, with a stator 108 positioned between the first rotor 104 and the second rotor 106. A rotor slot or a stator slot of the motor may be skewed through a predetermined angle to provide alternate harmonic poles of the same polarity. As the rotor turns, discontinuities on surfaces of the rotor and the stator disrupt the magnetic flux path of the motor. The flux path variation produces harmonics that affect the performance of the motor. A difference between the number of stator slots and rotor slots has a significant impact on the harmonics. One purpose of providing a rotor skew is to reduce magnetic logging.

Figure 8:
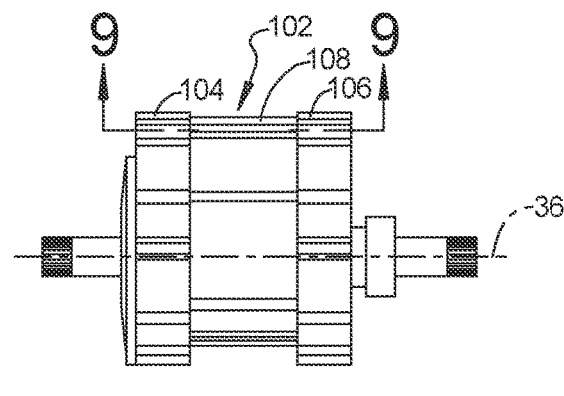
FIG. 8 is a front elevational view of a radial flux interior permanent magnet motor with skew having a vehicle electric motor system according to an exemplary aspect.

Referring to FIG. 9 and again to FIG. 8 an exemplary conductor element 110 positioned close to the first rotor 104 and the second rotor 106 and leaning toward a d-axis of the radial flux motor 102 has a cross-section change in an axial direction 112. The conductor element 110 is shaped having a smaller cross-section compared to conductor elements positioned closer to a q-axis of conductor element 110 and having a smallest cross-sectional area 114 having a thickness 116 approximately at a midpoint of the conductor element 110. Opposed ends 118 and 120 have a conductor element maximum thickness 122 which is greater than the thickness 116. This cross-sectional thickness change of the small cross-sectional area thickness 116 provides multiple benefits including to locally increase a slot-filling factor axially in the conductor element 110, maintain a slot-filling factor in the remaining portions of the conductor element 110 while enlarging a deepest embedded one of the conductor elements of the radial flux motor 102 which acts to decrease a DC loss of the radial flux motor 102, and provides a smaller slot area to increase a yoke size while decreasing an outside diameter of the conductor element 110.

Figure 9:
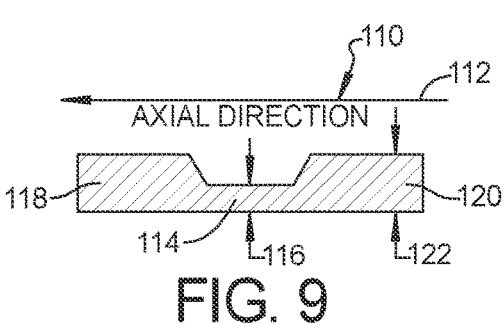
FIG. 9 is a cross-sectional side elevational view of a conductor taken at section 9 of FIG. 8.

Referring to FIG. 10 and again to FIGS. 8 and 9, a radial flux induction motor 124 is also provided with skew to maintain AC effects along an axial length of the induction motor 124. A rotor 126 is skewed throughout a length of the rotor.

Figure 10:
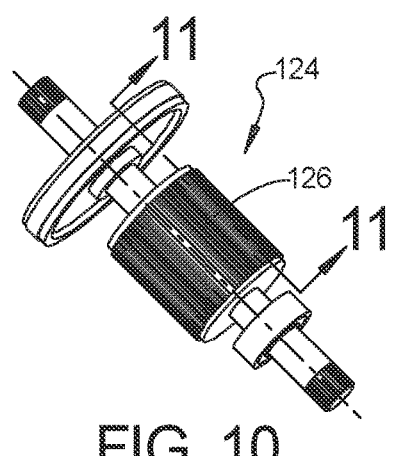
FIG. 10 is a front elevational view of a radial flux induction motor with skew having a vehicle electric motor system according to an exemplary aspect.
Figure 11:
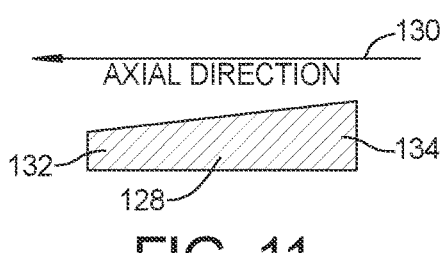
FIG. 11 is a cross-sectional side elevational view of a conductor taken at section 11 of FIG. 10.

Referring to FIG. 11 and again to FIG. 10 an exemplary conductor element 128 is modified from the conductor element 110 to provide a continuous tapering body in an axial direction 130. The conductor element 128 is narrowest at a first conductor end 132 and widest at a second conductor end 134. This cross-sectional thickness change of the conductor element 128 provides the same benefits as noted above with respect to the conductor element 110 described in reference to FIG. 9.

Referring to FIG. 12 and again to FIGS. 8 and 10, skew may also be incorporated in an axial flux motor. Portions of a rotor assembly 136 are overlapped to illustrate locations of a first conductor assembly 138 and a second conductor assembly 140 where conductor assemblies of the motor positioned closest to a rotor part leaning toward a d-axis have a smaller cross-section compared to conductor assemblies positioned closer to a rotor part leaning toward a q-axis of the motor. As shown and described in greater detail with reference to FIG. 13, the cross section of the conductor assembly is varied from an inside diameter (ID) to an outside diameter (OD) to help reduce an AC effect or loss.

Figure 12:
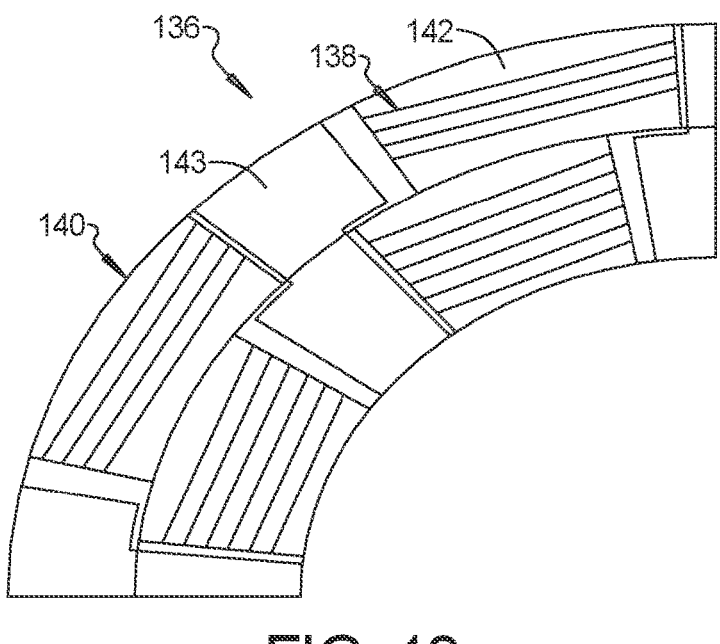
FIG. 12 is a top plan view of a rotor portion of an axial flux motor of the vehicle electric motor system of FIG. 1 having skew.
Figure 13:
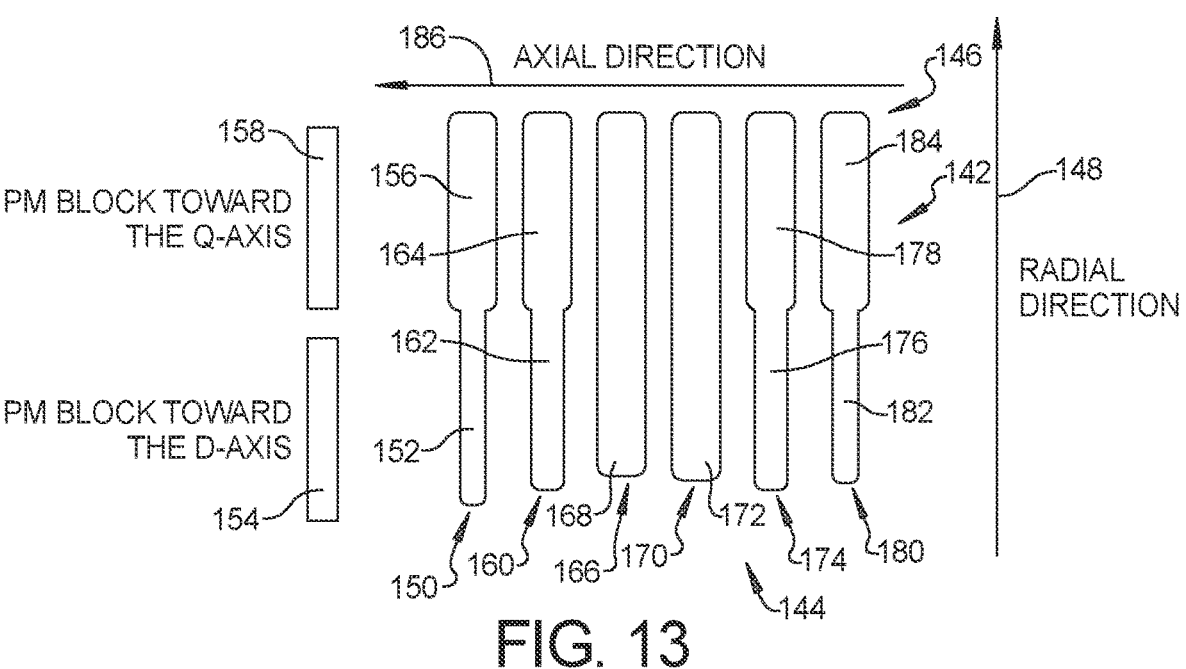
FIG. 13 is a top plan view of multiple conductors of a winding of the axial flux motor of FIG. 12.

Referring to FIG. 13 and again to FIG. 12, the conductor assembly 142 varies in cross-section from an inside diameter (ID) 144 to the outside diameter (OD) 146 in a radial direction 148. A first conductor assembly cross-section 150 has a first conductor element first end 152 proximate to a permanent magnet (PM) block 154 directed toward a d-axis, and a first conductor element second end 156 proximate to a permanent magnet (PM) block 158 directed toward a q-axis. A second conductor element cross-section 160 has a second conductor element first end 162 proximate to the permanent magnet (PM) block 154 which is wider than the first conductor element first end 152, and a second conductor element second end 164 proximate to the permanent magnet (PM) block 158 which is substantially equal in width to the first conductor element second end 156. A third conductor element cross-section 166 has a substantially equal width throughout its length both proximate to the PM block 154 and the PM block 158, which is wider than the second conductor element first end 162.

A fourth conductor element cross-section 170 is dimensionally substantially equal in width to the width of the third conductor element cross-section 166 throughout its length both proximate to the PM block 154 and the PM block 158. A fifth conductor element cross-section 174 is dimensionally substantially equal to the second conductor element cross-section 160. A sixth conductor element cross-section 180 is dimensionally substantially equal to the first conductor element cross-section 150. The width of the various conductor element cross-sections therefore vary with respect to the radial direction 148 and in an axial direction 186 parallel to an axis of the electric motor, in addition to varying from the inside diameter (ID) to the outside diameter (OD) to help reduce the AC effect or loss.

A vehicle electric motor system 10 of the present disclosure offers several advantages. These include: improvement of motor efficiency at high frequency; increase of a slot-filing factor; conductor element cross-section asymmetry may be applied to balance an asymmetry of AC effects caused by introduction of a motor skew; and conductor element cross-section geometry may be optimized to obtain homogeneity at a predetermined operating point.

What is claimed is:

1. A vehicle electric motor system, comprising:
an electric motor having:
at least one rotor; and
at least one stator;
multiple permanent magnets positioned on the at least one stator;
multiple windings mounted on the at least one rotor individually having a coiled conductor including multiple conductor elements, successive ones of the conductor elements varying in width,
wherein the motor defines a radial flux motor,
wherein the rotor includes an axial rotor skew,
wherein the at least one rotor defines a first rotor and a second rotor, and the at least one stator defines a first stator and a second stator, wherein at least one of the multiple conductor elements positioned proximate to the first rotor and the second rotor and skews a load toward a d-axis of the radial flux motor has a cross-section change in an axial direction,
wherein the at least one of the multiple conductor elements is shaped having a smaller cross-section compared to individual ones of the multiple conductor elements positioned proximate to a q-axis and skews the load toward the q-axis of the radial flux motor,
wherein the at least one of the multiple conductor elements includes:
a smallest cross-sectional area having a first thickness approximately at a midpoint of the at least one of the multiple conductor elements; and
opposed ends positioned oppositely about the smallest cross-sectional area individually having a conductor element second thickness greater than the first thickness.

2. The vehicle electric motor system of claim 1, including a first airgap located between the first rotor and the first stator, and a second airgap located between the second rotor and the second stator, the first airgap and the second airgap together defining a dual airgap.

3. The vehicle electric motor system of claim 1, wherein the first rotor is axially skewed to a similar degree with respect to the second rotor, with the first stator positioned between the first rotor and the second rotor.

4. The vehicle electric motor system of claim 1, wherein conductor elements having a least width are positioned closest to a first airgap between the first rotor and the first stator and closest to a second airgap between the second rotor and the second stator.

5. The vehicle electric motor system of claim 1, wherein conductor elements having a greatest width are positioned closest to a center of a grouping of the multiple conductor elements.

6. The vehicle electric motor system of claim 1, wherein the cross-section change locally increases a slot-filling factor axially in the at least one of the multiple conductor elements.

7. A vehicle electric motor system, comprising:
an electric motor having:
at least one rotor; and
at least one stator;
multiple permanent magnets positioned on the at least one stator;
multiple windings mounted on the at least one rotor individually having a coiled conductor including multiple conductor elements, successive ones of the conductor elements varying in width,
wherein the motor defines a radial flux motor,
wherein the rotor includes an axial rotor skew,
wherein the at least one rotor defines a first rotor and a second rotor, and the at least one stator defines a first stator and a second stator,
wherein at least one of the multiple conductor elements positioned proximate to the first rotor and the second rotor and leaning toward a d-axis of the radial flux motor has a cross-section change on an axis of the electric motor, and
wherein the at least one of the multiple conductor elements includes a continuous tapering body on the axis.

8. The vehicle electric motor system of claim 7, including a first airgap located between the first rotor and the first stator, and a second airgap located between the second rotor and the second stator, the first airgap and the second airgap together defining a dual airgap.

9. The vehicle electric motor system of claim 7, wherein the first rotor is axially skewed to a similar degree with respect to the second rotor, with the first stator positioned between the first rotor and the second rotor.

10. The vehicle electric motor system of claim 7, wherein conductor elements having a least width are positioned closest to a first airgap between the first rotor and the first stator and closest to a second airgap between the second rotor and the second stator.

11. The vehicle electric motor system of claim 7, wherein conductor elements having a greatest width are positioned closest to a center of a grouping of the multiple conductor elements.

12. The vehicle electric motor system of claim 7, wherein the cross-section change locally increases a slot-filling factor axially in the at least one of the multiple conductor elements.

13. The vehicle electric motor system of claim 7, wherein varying the width of individual ones of the multiple conductor elements balances alternating current and direct current loss effects.

14. A method for reducing alternating current losses of a vehicle electric motor, comprising:

producing an electric motor including mounting multiple windings on a first stator and an opposed second stator together defining a double stator;

positioning the first stator and the second stator between a first rotor and a second rotor defining a double rotor;

locating a first airgap between the first rotor and the first stator, and a second airgap between the second rotor and the second stator, the first airgap and the second airgap together defining a dual airgap;

positioning multiple permanent magnets on the first stator and the second stator;

mounting multiple windings on the first rotor and the second rotor;

constructing individual coiled conductors for individual ones of the multiple windings having multiple conductor elements; and varying a width of individual ones of the multiple conductor elements.

15. The method of claim 14, further including configuring the electric motor as an axial flux motor wherein the first rotor and the second rotor have an axial skew.

16. The method of claim 14, further including configuring the electric motor as a radial flux motor wherein the first rotor and the second rotor have an axial skew.

17. The method of claim 14, further including positioning conductor elements having a least width closest to the first airgap and the second airgap.

18. The method of claim 14, further including positioning conductor elements having a greatest width closest to a center of a grouping of the multiple conductor elements.

19. The method of claim 16, further including shaping at least one of the multiple conductor elements positioned proximate to the first rotor and the second rotor and leaning toward a d-axis of the radial flux motor to have a cross-section change on an axis of the electric motor, wherein the at least one of the multiple conductor elements includes a continuous tapering body on the axis.

20. The method of claim 16, further including shaping at least one of the multiple conductor elements positioned proximate to the first rotor and the second rotor and skewing a load toward a d-axis of the radial flux motor to have a cross-section change in an axial direction, wherein the at least one of the multiple conductor elements includes a smallest cross-sectional area having a first thickness approximately at a midpoint of the at least one of the multiple conductor elements, and opposed ends positioned oppositely about the smallest cross-sectional area individually having a conductor element second thickness greater than the first thickness.

* * * * *